United States Patent

McLevige et al.

[11] Patent Number: 5,996,464
[45] Date of Patent: Dec. 7, 1999

[54] FAIL SAFE VALVE AND MULTIPLEXED FLUID CONTROL SYSTEMS INCORPORATING THE SAME

[75] Inventors: Daniel J. McLevige, Davis; Brian Hoemke, Belvidere, both of Ill.

[73] Assignee: Woodward Governor Company, Roxkford, Ill.

[21] Appl. No.: 09/213,296

[22] Filed: Dec. 7, 1998

[51] Int. Cl.⁶ .................................................. F15B 13/16
[52] U.S. Cl. ............................... 91/361; 91/459; 91/461; 91/529; 137/596.17
[58] Field of Search ............................. 91/361, 459, 461, 91/527, 528, 529, 530, 534; 137/596, 596.17, 637.4

[56] References Cited

U.S. PATENT DOCUMENTS

| | | | |
|---|---|---|---|
| 4,913,032 | 4/1990 | Wernberg | 91/361 |
| 4,966,065 | 10/1990 | Wardle | 91/361 |
| 4,984,505 | 1/1991 | Leeson et al. | 91/361 |
| 4,986,305 | 1/1991 | Richards et al. | 137/625.15 |
| 5,048,394 | 9/1991 | McLevige et al. | 91/361 |
| 5,054,369 | 10/1991 | Wardle et al. | 91/361 |
| 5,081,903 | 1/1992 | Wardle et al. | 91/361 |
| 5,083,494 | 1/1992 | Dautremay | 91/361 |
| 5,088,383 | 2/1992 | Wardle et al. | 91/361 |
| 5,251,535 | 10/1993 | Lacher et al. | 91/459 X |
| 5,353,685 | 10/1994 | Snow | 91/511 X |
| 5,551,478 | 9/1996 | Veilleux, Jr. et al. | 137/596.15 |

FOREIGN PATENT DOCUMENTS 2 174 824  11/1988  United Kingdom .

*Primary Examiner*—Hoang Nguyen
*Attorney, Agent, or Firm*—Leydig, Voit & Mayer

[57] ABSTRACT

A fail-safe second stage valve for controlling actuator movement upon power loss in a multiplexed fluid power control system. The second stage valve is interposed between a corresponding actuator and a fluid multiplexer to operate generally as integrating or amplifying device which regulates flow to the actuator. The second stage valve is provided with a dampening mechanism in the form of a bleed port to reduce fluid flow to the actuator. The bleed port bleeds off accumulated fluid received by the second stage valve over a predetermined range of valve positions. This changes the position of the valve and thereby reduces flow rate to the actuator. The multiplexed fluid power control system using the fail-safe second stage valve controls the flow to the corresponding actuator upon electrical power loss. The actuator may be used to open and close variable stator vanes in an aircraft gas turbine engine.

22 Claims, 3 Drawing Sheets

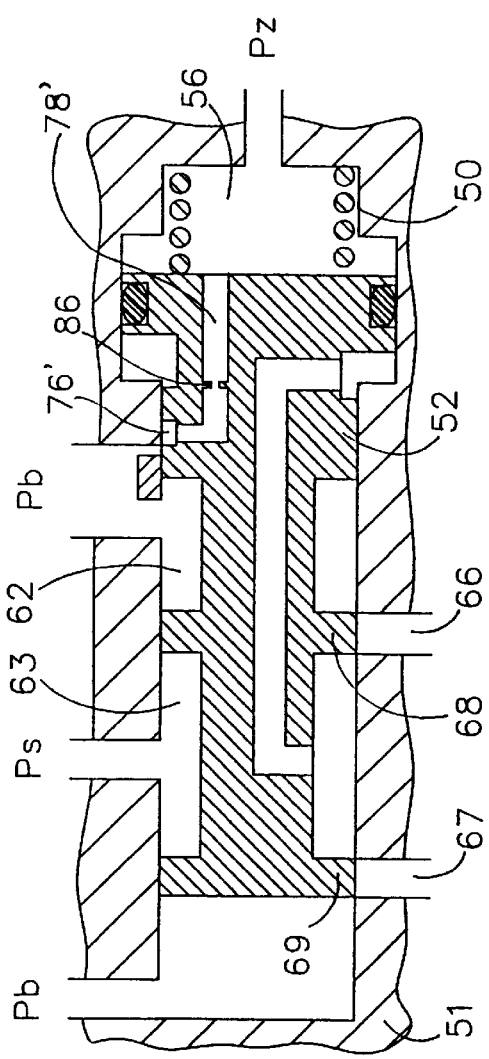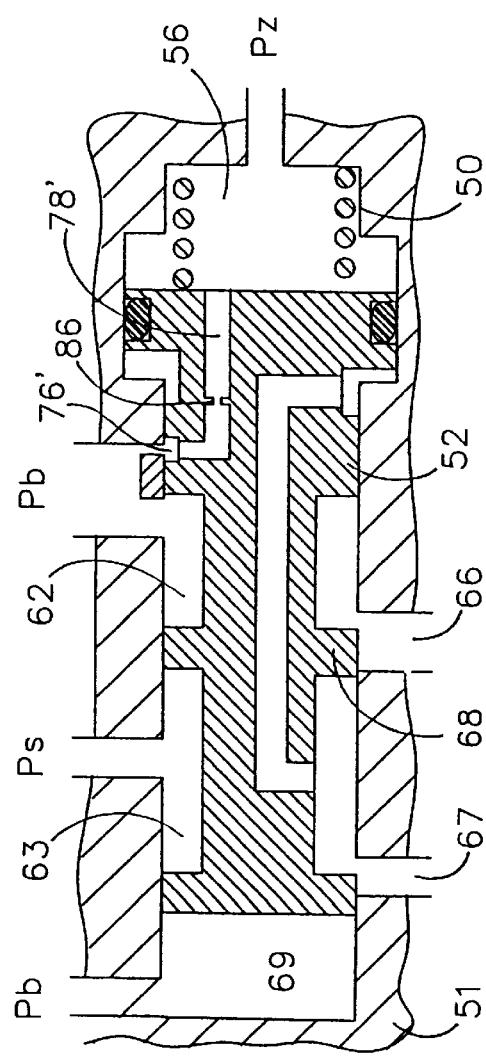

FAIL SAFE VALVE AND MULTIPLEXED FLUID CONTROL SYSTEMS INCORPORATING THE SAME

FIELD OF THE INVENTION

This invention relates to valves in fluid power systems, and more particularly in multiplexed fluid control systems.

BACKGROUND OF THE INVENTION

Multiplexed hydraulic control systems use a hydraulic multiplexer to multiplex or otherwise distribute the controlled output flow of a hydraulic control to multiple second stage valves and/or actuators. Significant cost and weight advantages exist in using hydraulically multiplexed control systems as opposed to separate hydraulic control systems because a dedicated hydraulic control for each actuator is not necessary. However, to realize the cost and weight advantages, it is often necessary for hydraulically multiplexed systems to match or exceed the performance that is achieved by non-multiplexed hydraulic control systems. To furnish similar performance as non-multiplexed systems, multiplexed control systems have needed to supply a sufficient amount of fluid flow to generate adequate force and/or sufficient rate of movement in the actuator. In some applications, amplification mechanisms in the form of second stage valves have been used to further increase the fluid flow and thereby the performance as shown in Leeson et al., U.S. Pat. No. 4,984,505, McLevige, et al., U.S. Pat. No. 5,048,394, Wardle, et al., U.S. Pat. No. 5,054,369, Wardle, et al., U.S. Pat. No. 5,081,903, and Wardle, et al., U.S. Pat. No. 5,088,383, the disclosures of which are hereby incorporated by reference.

The action of each second stage valve is generally that of a sample and hold device. Each second stage valve has a position which is periodically or sequentially updated from the hydraulic control. The position of each second stage valve is determined by the time integral of fluid flow from the hydraulic control. The position of the second stage valve determines a continuous fluid flow rate to the actuator. The second stage valve position is held until the next update from the hydraulic control.

One of the significant and exemplary applications of multiplexed hydraulic control systems is in aircraft systems where hydraulic controls are provided for adjusting the mechanical variables of gas turbine engines. Such hydraulic control systems using intermediate integrating second stage valves may be used when a large flow capacity is required, such as control of variable stator vanes. Variable stator vanes control the airstream entering the compressor blades in a gas turbine engine to improve engine performance.

A problem with such hydraulic control systems using integrating second stage valves occurs during electrical power loss to the hydraulic control. Under power loss conditions, it may be desired that certain actuators slew in a predetermined direction at a controlled rate. For example, in gas turbine engine systems it is desired that the actuator controlling the variable stator vanes slew in a closed direction at a controlled rate upon electrical power loss. In systems where the output flow of a hydraulic control is directly connected to an actuator, the hydraulic control may have a null bias which corresponds to a predetermined output flow to move the actuator in a predetermined direction at a predetermined rate upon power loss. However, in hydraulic control systems utilizing integrating sample and hold second stage valves, a predetermined output flow from a hydraulic control causes each actuator to move at an increasing rate each time its corresponding second stage valve is updated. This causes the actuators to slew uncontrolled at maximum velocity. Such uncontrolled maximum velocity slew is unacceptable in many situations, particularly for actuators controlling certain critical functions such as the variable stator vanes in gas turbine engines.

SUMMARY OF THE INVENTION

It is a general aim of the present invention to provide a more practical and reliable multiplexing fluid power control system.

In that regard, it is an objective of the present invention to control the rate of actuator movement during power loss in multiplexed fluid power control systems that use integrating second stage valves.

According to one aspect of the present invention, it is an object of the present invention to provide for a hydraulic multiplexed control system which closes the variable stator vanes of a gas turbine engine at a controlled rate upon electrical power loss.

It is therefore a feature of the present invention to provide a fail-safe second stage valve that includes a dampening mechanism to limit or otherwise control the output flow rate to a corresponding actuator upon electrical power loss in a multiplexed fluid control system.

According to the preferred embodiment, the multiplexed fluid control has a null position during power loss that produces a predetermined controlled output flow. The fail-safe second stage valve includes a control chamber which periodically receives and accumulates the controlled output flow from the fluid control. The position of the second stage valve is determined by the amount of accumulated fluid in the control chamber which in turn determines the output flow to the corresponding actuator. Once the second stage valve reaches a predetermined position, a bleed port opens which connects the control chamber to a higher or lower pressure fluid source. This causes fluid to flow through the bleed port which repositions the second stage valve to a more desirable position.

It is an advantage of the present invention that the actuators of fail-safe second stage valves can move at a controlled rate in a predetermined direction during power loss. This allows for fail-safe control of certain critical functions such as the variable stator vanes of an aircraft gas turbine engine.

It is another feature of the present invention that the fail-safe second stage valve can maintain the desired performance under normal electrically powered operating conditions. According to this feature, the electronic controller associated with the multiplexed system includes software control laws which compensate for fluid flow through the bleed port. More specifically, the electronic control can anticipate when the bleed port is open from feedback that indicates actuator position. If the electronic controller anticipates that the bleed port will open, the electronic controller can issue a command to the hydraulic control that increases the fluid signal to compensate for fluid bleed through the bleed port.

These and other objects and advantages of the invention will become more apparent from the following detailed description when taken in conjunction with the accompanying drawings.

BRIEF DESCRIPTION OF THE DRAWINGS

FIG. 3a is a cross-sectional view of a second preferred embodiment of a fail-safe second stage valve according to the present invention.

FIG. 3b illustrates the fail-safe second stage valve of FIG. 3a in an alternate position.

Figure 1:
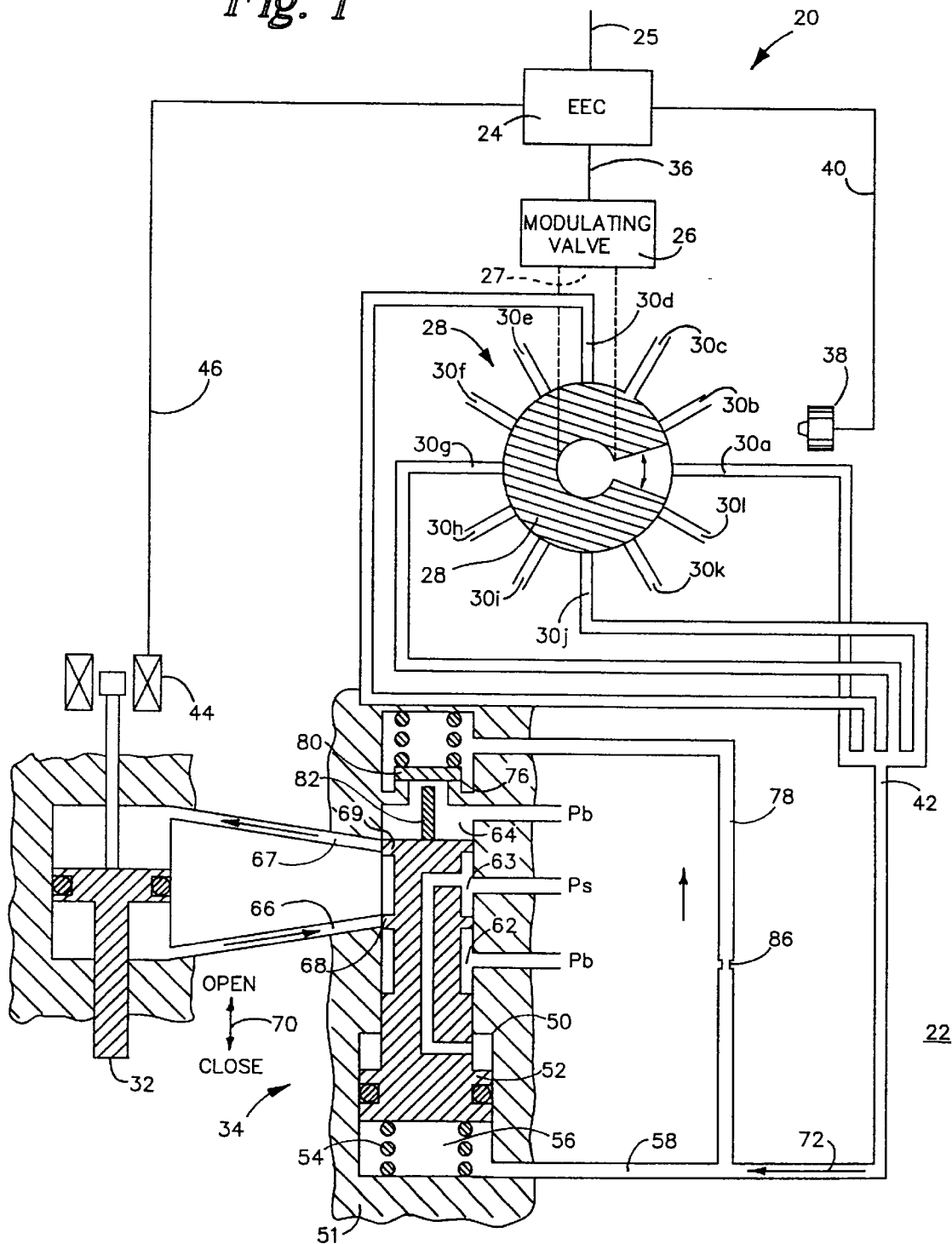
FIG. 1 is a partly schematic illustration exemplifying a fail-safe second stage and multiplexed hydraulic control system exemplifying a first embodiment of the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

For purposes of illustration and referring to FIG. 1, a preferred embodiment of the present invention has been exemplified in partly schematic form as a multiplexed hydraulic control system 20 having a plurality of channels. To provide for a better understanding of the present invention, only one channel 22 is fully illustrated in FIG. 1.

The multiplexed control system 20 includes an electronic engine controller 24 (EEC) that sends a plurality of electrical command signals on line 36 to a hydraulic control or other fluid control means shown schematically as modulating valve 26. In accordance with the electrical command signals, the modulating valve 26 sequentially produces a plurality of hydraulic power signals to a fluid input 27 of a fluid multiplexer, exemplified in FIG. 1 as being a rotary commutator 28 with a plurality of output ports 30A–30L. The hydraulic power signals have magnitudes related to their respective electrical signals and are in the same sequence. The rotary commutator 28 rotates to sequentially or periodically connect the fluid input 27 with the output ports 30A–30L and individually distribute respective hydraulic power signals to the output ports 30A–30L. Although only one channel 22 having an actuator 32 coupled with a fail-safe second stage valve 34 is illustrated in FIG. 1, it will be appreciated that output ports 30B,C,E,F,H,I,K,L may form other channels which could include an actuator and may include a form of intermediate second stage valve to integrate signals along to the actuator.

In the operation of the present embodiment and using channel 22 as exemplary, the electronic controller 24 receives external demand signals along an electrical input line 25 to set a demanded position for the actuator 32 in the respective channel 22. The electronic controller 24 processes external demand signals along with feedback signals and the like to produce an electrical command signal which is related to the demanded position of the actuator 32 in the channel 22. Those electrical command signals are output on a line 36 when a position sensor 38 associated with the commutator 28 outputs a respective position signal on line 40 to the electronic controller 24 which indicates a prospective fluidic connection between the input 27 and an associated output 42.

Referring to the one output 42 in channel 22, it is seen that four output ports 30 A,D,G,J converge into one output 42. An advantage of having this configuration is that the channel 22 may be updated by the multiplexed hydraulic control system 22 more frequently than other channels. This provides for a higher performance and an increased response from the actuator in that channel. However, it will be appreciated that more or fewer output ports may be connected to the output 42.

To provide for closed loop control of the channel 22 in the preferred embodiment, the actuator 32 has an associated position feedback device 44, such as a linear variable displacement transducer or other appropriate means, which provides continuous feedback on line 46 to the electronic controller 24. The electronic controller 24 matches the external demand signals for the various actuators with associated feedback signals from the various actuators to produce the electrical command signals. Using the feedback from the position feedback device 44, the electronic controller 24 also calculates the rate of position change for the actuator 32 by comparing time versus position for the actuator 32. By knowing the rate of position change for the actuator 32, the flow rate to the actuator and hence the position of the second stage valve 34 is known because flow rate is proportionally related to the restricted orifice provided by the second stage valve 34.

Referring now in greater detail to channel 22, the preferred embodiment of the present invention provides the fail-safe second stage valve 34 which can regulate a continuous flow rate to its corresponding actuator 32. The second stage valve includes a valve body 51 having a bore 50 with a spool 52 axially translatable therein or other valve operator for controlling fluid flow. The valve 34 may include a spring 54 to bias the spool 52 within the bore 50. In the preferred embodiment, the combination of the spool 52 and the bore 50 form a control volume or chamber 56 which integrates respective hydraulic signals received from the modulating valve 26 to control the position of the spool 52. The control chamber 56 is connected via a fluid conduit 58 to the corresponding output 42 to receive the respective hydraulic signals.

The valve 34 provides three annular fluid chambers 62, 63, 64 provided by annular recesses radially about the spool 52 to provide for fluid flow to and from the actuator 32. The sump chambers 62 and 64 are vented to an external low pressure sump (PB) for venting fluid from the actuator 32, while a high pressure chamber 63 is externally supplied by higher pressure fluid (PS) to power the actuator 32. The position of the spool 52 determines the flow of fluid through two actuator ports 66, 67 to and from the actuator 32. More specifically, it may be seen that the spool 52 includes two annular metering lands 68, 69 which control the size of openings between the actuator ports 66, 67 and the fluid chambers 62, 63, 64. The size of the openings between the actuator ports 66, 67 and the fluid chambers 62, 63, 64 is proportionally related to the fluid flow rate to and from the actuator 32. Although the present embodiment provides two lands 68, 69 and two ports 66, 67 for four-way flow between the actuator 32 and second stage valve 34, it will be appreciated that other appropriate porting arrangements in alternative embodiment such as one port and land providing three-way flow between the actuator 32 and second stage valve 34 will work in a similar manner.

The present embodiment of FIG. 1 schematically illustrates use of the actuator 32 for controlling the opening and closing of variable stator vanes (not shown) of an aircraft gas turbine engine (not shown), the open and closed direction being indicated by arrow 70. As such for the present embodiment of FIG. 1, it is desired that the actuator 32 move in the closed direction upon power loss.

To move the actuator in the closed direction 70 upon electrical power loss, the modulating valve 26 produces a predetermined hydraulic signal or other controlled output flow to the output 42, as will be later explained in greater detail, in this case a positive signal schematically indicated by arrow 72. The positive signal 72 received by the control chamber 56 positions the spool 52 to connect the sump (PB) to actuator port 66 and the high pressure fluid supply (PS) to actuator port 67. This creates a controlled flow of fluid to corresponding actuator 32 which in turn slews the actuator 32 in the closed direction.

In accordance with the aims, objects and features, the preferred embodiment of the present invention provides the fail-safe second stage valve 34 which controls fluid flow rate to its corresponding actuator 32 upon loss of electrical power. The second stage valve 34 includes a dampening mechanism preferably in the form of a bleed port 76 for reducing and controlling flow to the actuator 32 upon power loss. The bleed port 76 via conduit 78 provides for a connection between the control chamber 56 and a fluid source at a different pressure, in this case the hydraulic sump (PB) for venting accumulated hydraulic power signals received in the control chamber 56. The bleed port 76 is preferably opened over a determined range of positions for the spool 52. In the present embodiment, flow through the bleed port 76 is controlled by a spring biased poppet 80. A rod 82 coupled with the spool 52 variably opens the poppet 80 and causes the control chamber 56 to vent to the hydraulic sump (PB).

In operation, the bleed port 76 dampens hydraulic power signals received by the second stage valve 34 to regulate the slew rate of its corresponding actuator 32 during loss of electrical power to the modulating valve 26. Recalling that upon power loss the modulating valve 26 outputs a predetermined hydraulic power signal, it will be understood that the control chamber 56 accumulates numerous predetermined hydraulic power signals because the rotary commutator 28 continues to open and close the multiplexer ports 30A,D,G,J corresponding with the output 42 for the channel 22. These predetermined hydraulic signals eventually cause the bleed port 76 to open past the cracking point, the cracking point corresponding to an axial position of the spool 52 where the rod 82 is contacting the poppet 80. Once the rod pushes the poppet 80 past the cracking point, fluid vents from the control chamber 56 to the hydraulic sump (PB) which in turn causes the spool 52 to translate to positions corresponding to lower hydraulic flow rates to the actuator 32. While the hydraulic input 27 of the multiplexer is connected to other output ports 30B,C,E,F,H,I,K,L, fluid continues to vent from the control chamber 56 to the hydraulic sump (PB). This substantially closes the bleed port 76 and repositions the spool 52 at or near the cracking point until the next predetermined power loss hydraulic power signal is received. As shown in FIG. 1, the bleed conduit 78 may also include a restriction 86 to limit the maximum rate at which fluid bleeds through the bleed port 76. By utilizing the fail-safe second stage valve 34, the present embodiment of FIG. 1 provides a hydraulic multiplexed control system 20 that can close the variable stator vanes and control other critical functions of an aircraft gas turbine engine at a controlled rate upon power loss.

Figure 2:
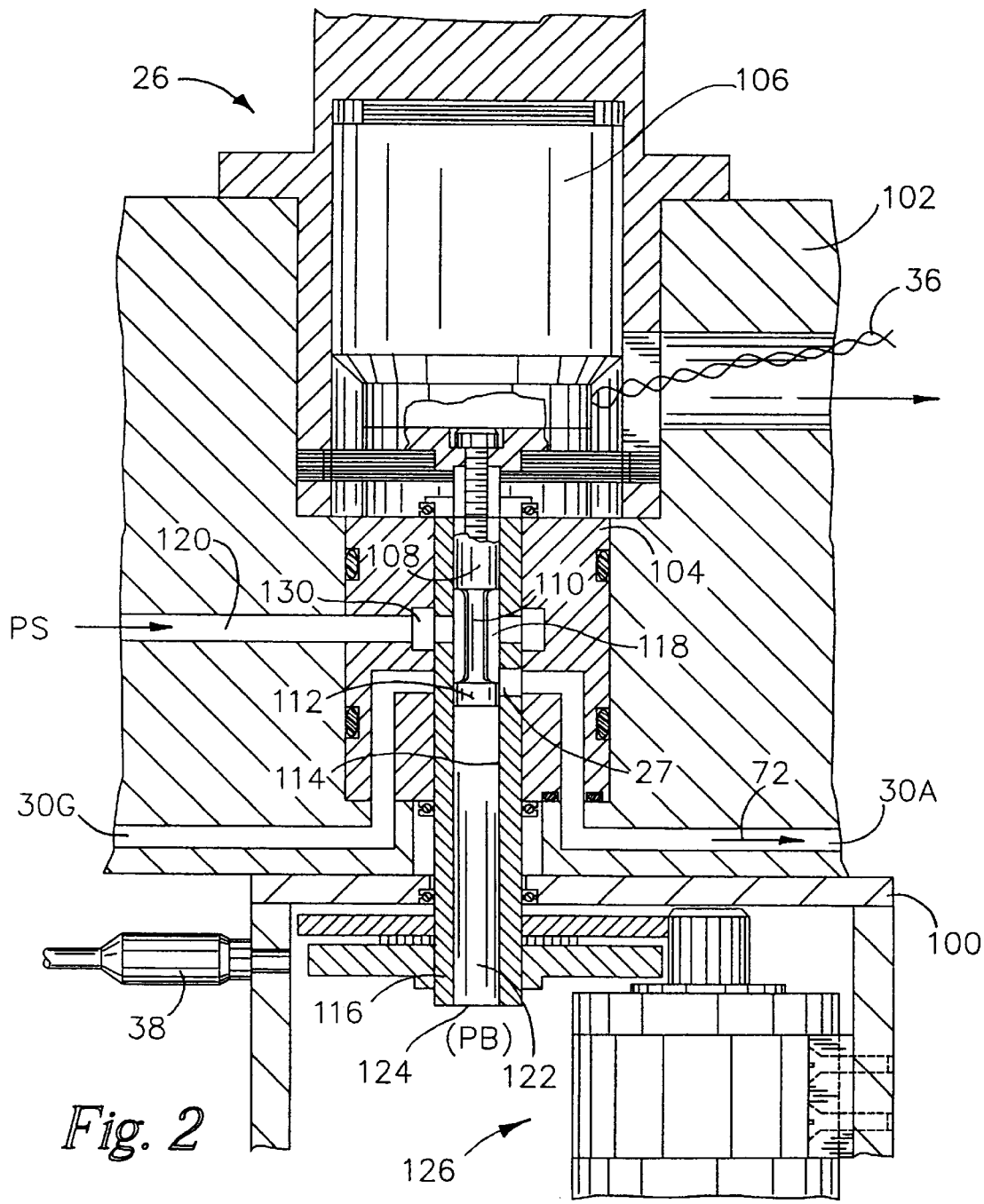
FIG. 2 illustrates a cross-sectional view of an exemplary modulating valve and an exemplary fluid multiplexer, with the modulating valve in a failsafe null position.

To provide the predetermined hydraulic power signal, the preferred embodiment provides a modulating valve 26 with a null position which corresponds to the predetermined hydraulic power signal. An exemplary embodiment of the modulating valve 26 in the null position and multiplexer of FIG. 1 is shown in greater detail in FIG. 2. As shown in FIG. 2, the modulating valve assembly 26 is built on a base member 100 which carries a valve body 102 having a plurality of ports therein. Mounted within the valve body 102 is a valve insert generally indicated at 104 which includes both the modulating control member 108 and the multiplexing assembly 114. A relatively high speed electro-mechanical force motor 106, such as a voice coil or a torque motor or other appropriate means, is provided for controlling the linear position of a modulating valve spool 108. The force motor 106 is connected to electronic controller 24 (shown in FIG. 1) by line 36 to receive electrical command signals to controllably position the valve spool 108. In the present embodiment, the position of the valve spool 108 is proportional to current applied to the force motor 106.

Referring now to the valve itself, the valve spool 108 includes a rodlike member 110 connected to an enlarged cylindrical metering land 112 closely fitting within a cylindrical bore 114 provided by a rotary sleeve 116. Between the rod-like member 110 and the metering land 112, there is formed a high pressure chamber 118 connected via an inlet port 120 to a high pressure fluid (PS) for providing positive high pressure hydraulic power signals. Similarly, there is also a low pressure chamber 122 connected via an outlet port 124 for generating negative hydraulic power signals in which fluid vents to a hydraulic sump (PB).

Referring now to the multiplexing assembly, there is provided the rotary sleeve 116 mechanically connected to receive rotary movement from a rotary motor 126, such as a hydraulic turbine, an electric motor, or the engine gearbox for example. The rotary sleeve 116 includes the open segment input 27 connectable to the high pressure and low pressure chambers 118, 122. The valve insert 104 includes the several output ports 30A–30L (from FIG. 1), however, only output ports 30A and 30G are shown in the cross sectional view of FIG. 2. As the sleeve 116 rotates, the input 27 is sequentially connected and disconnected to the output ports 30A–30L as may better be seen in FIG. 1.

During normal operation, the force motor 106 linearly translates the valve spool 108 relative to the sleeve 116 to produce positive or negative hydraulic signals of variable magnitude to the respective output ports. The metering land 112 of the valve spool 108 provides a variably sized restriction between either the high or low pressure chambers 118, 122 and the output ports 30A–30L. The position of the metering land 112 produces hydraulic signals to the outputs that are proportionally related to the size of opening provided by the restriction.

During loss of the electrical command signals provided to the force motor 106 along the line 36, the valve spool 108 returns to a null position, a position generally corresponding to zero current applied to the force motor 106. To provide for a predetermined hydraulic signal, the modulating valve 26 provides a null position which corresponds to a predetermined positive hydraulic signal represented by the arrow 72, as is shown in FIGS. 1 and 2. The null position thereby achieves a controlled flow rate to the actuator 32 shown in FIG. 1 as is aforementioned. It will be appreciated that with some force motors, a spring (not shown) may be used to bias the valve spool to a reliable zero current position. Although an exemplary multiplexer and exemplary modulating valve has been shown in FIG. 2, it will be understood that other appropriate multiplexing and fluid control means which can be configured to generate a controlled output flow upon electrical power loss to the channels may be used with the fail-safe valve of the preferred embodiments.

Turning now to FIGS. 3a and 3b, there is shown an alternative preferred embodiment of a fail-safe second stage valve 34 which has the advantage of not needing a spring biased poppet as compared to the first embodiment shown in FIG. 1. To facilitate easier understanding of the second embodiment, similar structures have been referenced by similar reference characters. The second stage valve 34 shown in FIG. 3a also includes the spool 52 axially positionable by hydraulic power signals received and accumulated in the control chamber 56. However, for the second stage valve of FIG. 3a, the bleed port 76' is defined internally in the spool 52 itself. In the second embodiment, the bleed port 76' is connected to the control chamber 56 by the intermediate conduit 78' defined in the spool. A predetermined range of axial positions of the spool 52 connects the bleed port 76' to the hydraulic sump (PB) to reduce the accumulated fluid in the control chamber and thereby modify the flow output to the associated actuator. The axial location of the bleed port 76' on the spool 52 determines the final opening to the actuator ports 66, 67 and thus the slew rate of the actuator 32 (shown in FIG. 1). In this case the bleed port 76' is set to open immediately upon axial translation of the spool 52 shown in FIG. 3a. However, the location of the bleed port 76' can be selected to provide a desired slew rate for the actuator 32 (shown in FIG. 1) upon electrical power loss.

FIG. 3b shows the spool 52 in a position wherein the control chamber 56 is connected by the bleed port 76' to the hydraulic sump (PB). In this position, fluid bleeds from the control chamber 56 to the hydraulic sump (PB). Assuming the associated hydraulic control is servicing another channel, fluid bleeds to the sump (PB) until the spool 52 reaches a position at or near the spool 52 position exemplified in FIG. 3a. While fluid is bleeding, fluid is also being communicated to the actuator ports which can provide a desired slew for the corresponding actuator (shown in FIG. 1). It should also be apparent that the opening between the bleed port and the hydraulic sump port (PB) diminishes in size as the spool translates from the position shown in FIG. 3b to the position shown in FIG. 3a meaning that the spool 52 decelerates.

In accordance with a feature of the present invention, the multiplexed hydraulic control system 20 including either embodiment of the fail-safe second stage valve 34, as shown in FIGS. 1 and 3a, 3b can maintain high performance under electrically powered conditions. For steady state and negative hydraulic power signals, signals which retract the actuator 32, the bleed port 76' stays closed and operations are normal. For positive hydraulic power signals, the bleed port 76' will open, reducing system gain, which may be compensated for by addition of software control laws to the electronic controller 24.

As discussed above, the electronic controller 24 can calculate approximate second stage valve 34 position based on continuous feed back from the corresponding actuator feed back device 44 (See FIG. 1). As such, additional control laws can be used to develop the signal which compensates for the fluid bleed through the bleed port 76. For example, derivative (rate of change) of the actuator 32 position command can be used in place of derivative of output position. This has the advantage that the command signal derivative should be less noisy than the output signal derivative. Noise susceptibility is a well known problem in control systems using derivatives. Another control law that can be used to determine the control compensation signal is error between command and actual actuator 32 position. A combination of control laws may also be used. The form of the compensation signal is to add a fixed delta current to the force motor 106 command to counteract the effect of the bleed port 76. Referring to FIG. 2, the increased magnitude hydraulic power signal is accomplished by axially translating the valve spool 108 a greater distance relative to the sleeve 116 to produce a larger magnitude signal.

What is claimed is:

1. A multiplexed fluid power control system for individually controlling the positions of a plurality of actuators, comprising the combination of:

a fluid multiplexer having an input and a plurality of outputs, the multiplexer having a plurality of positions, each position fluidically connecting one of the outputs to the input;

a fluid control adapted to produce a controlled output flow through the input;

a second stage valve having a control chamber connected to one of the outputs, the second stage valve producing an output flow to an associated actuator determined by an accumulation of fluid received in the control chamber from the respective output; and a bleed port fluidically connecting the control chamber to a fluid source when said accumulation reaches a predetermined magnitude, the fluid source having a fluid pressure that is different than the pressure in the control chamber, wherein fluid flow through the bleed port modifies the accumulated amount of fluid in the control chamber and thereby the output flow to the associated actuator.

2. The multiplexed fluid power control system of claim 1 wherein fluid flow through the bleed port reduces the output flow rate to the associated actuator.

3. The multiplexed fluid power control system of claim 1 wherein the bleed port provides a variably sized orifice between the control chamber and the fluid source, the size of the orifice decreasing while the second stage valve is disconnected from the input of the multiplexer.

4. The multiplexed fluid power control system of claim 1 wherein the fluid source comprises a fluidic sump outlet having a pressure that is less than the pressure in the control chamber.

5. The multiplexed fluid power control system of claim 1 wherein the associated actuator of said at least one second stage valve controls the opening and closing of a plurality of variable stator vanes in a gas turbine engine.

6. The multiplexed fluid power control system of claim 1 wherein the fluid control is electrically powered and produces a predetermined fluid power signal to the outputs upon loss of the electrical power, fluid flow through the bleed port eliminating substantially all of each associated predetermined fluid power signal once the accumulation of the received fluid power signals reaches the predetermined magnitude.

7. The multiplexed fluid power control system of claim 6 further comprising electronic control means for electrically commanding the fluid control to increase the controlled output flow to the second stage valve to compensate for the amount of fluid bleed through the bleed port when the predetermined magnitude is reached.

8. The multiplexed fluid power control system of claim 1 wherein the second stage valve comprises a valve body defining an annular bore and a spool linearly translatable within the annular bore, the spool integrally defining the bleed port.

9. A multiplexed fluid power control system having a plurality of channels for controlling the positions of a plurality of actuators in the channels in accordance with a corresponding plurality of electrical control signals, comprising the combination of:

fluid control means responsive to the electrical control signals for producing a plurality fluid power signals that have magnitudes corresponding to the electrical control signals;

multiplexing means fluidically connected with said fluid control means for distributing the fluid power signals to the channels on a time multiplexed basis;

integrating means in the channels for integrating the associated fluid power signals in each of the associated channels, the integrating means accumulating fluid flow from the multiplexing means for its associated channel to produce an output fluid flow rate determined by an accumulation of the fluid power signals;

the actuator in each channel being connected to receive the output fluid flow of the integrating means in that channel, thereby to control the position of each actuator in dependence upon the associated electrical signal for each channel; and dampening means in at least one of the channels for dampening the fluid flow rate to respective actuators when the accumulation of the fluid power signals reaches a predetermined magnitude.

10. The multiplexed fluid control system of claim 9 wherein said dampening means reduces the magnitude of the accumulated fluid power signals.

11. The multiplexed fluid control system of claim 10 further including means for selectively adjusting the magnitude of said electrical control signals to increase the magnitude of the fluid power signals and compensate for reductions in accumulated fluid power signals at said predetermined magnitude.

12. The multiplexed fluid control system of claim 9 wherein the dampening means comprises a bleed conduit fluidically connecting the accumulation of the fluid power signals to a fluidic sump at said predetermined magnitude.

13. The multiplexed fluid control system of claim 9 wherein the fluid control means produces a plurality of predetermined fluid power signals upon loss of the electrical signals, said dampening means eliminating substantially all of the predetermined fluid power signal in its associated channel when the accumulation of the fluid power signals reaches said predetermined magnitude.

14. The multiplexed fluid control system of claim 9 wherein at least one of the actuators associated with the dampening means controls the opening and closing of a plurality of variable stator vanes in an aircraft gas turbine engine.

15. The multiplexed fluid control system of claim 9 wherein the dampening means and the integrating means are provided by a second stage valve, the second stage valve including a movable operator, a valve body and a control chamber, the control chamber connected to one of the channels to receive fluid signal therein, the movable operator having a position inside the valve body determined by fluid pressure in the control chamber, wherein the position of the movable operator determines the output fluid flow rate to a corresponding actuator and a predetermined range of positions of the movable operator fluidically connects the control chamber to a fluidic sump outlet.

16. A second stage valve for a multiplexed fluid power control system, the multiplexed fluid power system including a multiplexer and a modulating valve, the multiplexer distributing a controlled output flow of the modulating valve to a plurality of outputs for the control of a plurality of actuators, comprising:

a valve body having a control chamber adapted to be connected to one of the outputs and an actuator output adapted to be connected to an actuator;

a movable valve operator disposed within the valve body having a position determined by fluid pressure in the control chamber, the position of the valve operator controlling fluid flow through the actuator output; and a bleed port fluidically connecting the control chamber to an external fluid source over a predetermined range of valve operator positions, the fluid source having a different pressure than the pressure in the control chamber wherein fluid flow through the bleed port causes the movable operator to translate within the valve body to thereby modify fluid flow through the actuator output.

17. The integrating valve of claim 16 wherein said translation of the movable operator occurs while said at least one second stage valve is disconnected from said modulating valve.

18. The integrating valve of claim 17 wherein the bleed port provides a variably sized opening for fluid flow between the control chamber and the fluid source over the predetermined range, the variably sized opening decreasing in size while the at least one second stage valve is disconnected from said modulating valve.

19. The integrating valve of claim 16 wherein the fluid source is a fluidic sump having a pressure that is less than the pressure in the control chamber.

20. The integrating valve of claim 16 wherein the movable valve operator internally defines the bleed port.

21. The integrating valve of claim 16 wherein the valve operator is a spool valve axially translatable within an annular bore defined by the valve body, the integrating valve further including a poppet engaging the bleed port, the valve body defining a conduit connecting to the control chamber to the poppet, the spool engaging the poppet in the predetermined range to provide an opening between the conduit and the bleed port to thereby connect the control chamber to the bleed port.

22. The integrating valve of claim 16 wherein the modulating valve is electrically controlled, the modulating valve having a position which provides a predetermined output flow upon loss of electrical control.

* * * * *